US010295140B2

(12) United States Patent
Ito et al.

(10) Patent No.: US 10,295,140 B2
(45) Date of Patent: May 21, 2019

(54) VEHICULAR LAMP, INSPECTION METHOD OF ORGANIC EL ELEMENT

(71) Applicant: Koito Manufacturing Co., Ltd., Tokyo (JP)

(72) Inventors: Toru Ito, Shizuoka (JP); Masaya Shido, Shizuoka (JP); Yoshiro Ito, Shizuoka (JP); Yasutaka Sasaki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 15/473,878

(22) Filed: Mar. 30, 2017

(65) Prior Publication Data

US 2017/0292673 A1 Oct. 12, 2017

(30) Foreign Application Priority Data

Apr. 7, 2016 (JP) ................................. 2016-077188

(51) Int. Cl.

| | |
|---|---|
| ***F21S 43/13*** | (2018.01) |
| ***F21S 43/20*** | (2018.01) |
| ***B07C 5/342*** | (2006.01) |
| ***B60Q 1/30*** | (2006.01) |
| ***H05B 33/04*** | (2006.01) |
| ***F21S 43/145*** | (2018.01) |

(52) U.S. Cl.

CPC .............. *F21S 43/13* (2018.01); *B07C 5/342* (2013.01); *B60Q 1/30* (2013.01); *F21S 43/145* (2018.01); *F21S 43/26* (2018.01); *H05B 33/04* (2013.01)

(58) Field of Classification Search

CPC ......... H01L 51/56; F21S 43/13; F21S 43/145; F21S 43/23

See application file for complete search history.

(56) References Cited

U.S. PATENT DOCUMENTS

2005/0215163 A1* 9/2005 Tamura .................. H01L 51/56 445/24

FOREIGN PATENT DOCUMENTS

JP 2015-215995 A 12/2015

* cited by examiner

*Primary Examiner* — Anne M Hines

(74) *Attorney, Agent, or Firm* — Abelman, Frayne & Schwab

(57) ABSTRACT

The present disclosure provides a vehicular lamp including an organic EL element that has only a non-light emitting point with a size of 120 μm or less on a light emitting surface.

6 Claims, 5 Drawing Sheets

FIG.4

| SEALANT THICKNESS (M) OR INTERFACE LENGTH (N) [mm] | GROWTH RATE AT LAST USAGE STAGE | MAXIMUM VALUE OF SIZE P OF NON-LIGHT EMITTING POINT ALLOWABLE AT INITIAL USAGE STAGE [μm] | | |
|---|---|---|---|---|
| | | SIZE ALLOWABLE AT LAST USAGE STAGE: MAXIMUM 50μm | SIZE ALLOWABLE AT LAST USAGE STAGE: MAXIMUM 100μm | SIZE ALLOWABLE AT LAST USAGE STAGE: MAXIMUM 300μm |
| 1~3 | 32 | 1 | 3 | 9 |
| 3~7.5 | 16 | 3 | 6 | 18 |
| 7.5~12.5 | 8 | 6 | 12 | 37 |
| 12.5~17.5 | 4 | 12 | 25 | 75 |
| 17.5~22.5 | 2.5 | 20 | 40 | 120 |

VEHICULAR LAMP, INSPECTION METHOD OF ORGANIC EL ELEMENT

CROSS-REFERENCE TO RELATED APPLICATIONS

This application is based on and claims priority from Japanese Patent Application No. 2016-077188, filed on Apr. 7, 2016, with the Japan Patent Office, the disclosure of which is incorporated herein in its entirety by reference.

TECHNICAL FIELD

The disclosure relates to a vehicular lamp and an inspection method of an organic EL element.

BACKGROUND

Conventionally, there has been known a vehicular lamp including a planar light-emitting body constituted by an organic EL element (see, e.g., Japanese Patent Laid-Open Publication No. 2015-215995).

SUMMARY

As a result of intensive studies on a vehicular lamp provided with an organic EL element, the inventors of the present disclosure have recognized that an appearance defect may occur in the vehicular lamp with the lapse of usage time of the organic EL element.

The present disclosure has been made in view of such circumferences, and an object thereof is to provide a technique of suppressing an appearance defect of a vehicular lamp mounted with an organic EL element.

In order to solve the above described problem, according to an aspect of the present disclosure, there is provided a vehicular lamp. The vehicular lamp includes an organic EL element that has only a non-light emitting point with a size of 120 μm or less on a light emitting surface. According to the aspect, an appearance defect of the vehicular lamp may be suppressed.

According to the aspect, a size of the non-light emitting point may be 20 μm or less. In the aspect, the organic EL element is accommodated in an inner space formed by a first substrate, a second substrate, and a sealant interposed between the first substrate and the second substrate at peripheral portions of the first substrate and the second substrate, and a thickness of the sealant from the inner space to an outer space may be 22.5 mm or less. According to the aspect, the organic EL element is accommodated in an inner space formed by a substrate and a sealant that covers a surface of the substrate, and a length of an interface between the substrate and the sealant from the inner space to an outer space may be 22.5 mm or less According to another aspect of the present disclosure, there is provided a method of inspecting an organic EL element. The inspection method includes sorting an organic EL element having a non-light emitting point with a size larger than a predetermined threshold value, on a light emitting surface, as a defective product. The threshold value is 120 μm or less. According to the aspect, an appearance defect of the vehicular lamp may be suppressed.

According to the present disclosure, there is provided a technique of suppressing an appearance defect of a vehicular lamp mounted with an organic EL element.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 4 illustrates a table indicating a relationship between a thickness of a sealant, and a growth rate and size of a non-light emitting point.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, preferred exemplary embodiments of the present disclosure will be described with reference to the drawings. Further, the exemplary embodiment is not intended to limit the present disclosure thereto, but is merely exemplary. All features described in the exemplary embodiment or combinations thereof may not be essential for the present disclosure. Identical or corresponding components, members, and processes in each of the drawings will be denoted by the same symbols, and overlapping descriptions thereof will be appropriately omitted. In addition, a scale or a shape of each component illustrated in each of the drawings is conveniently set in order to facilitate descriptions thereof and should not be construed as being limited unless specified. In addition, for example, the terms "first" and "second" used herein or the claims are not intended to refer to any order or importance but are intended to discriminate a component from another component.

Figure 1:
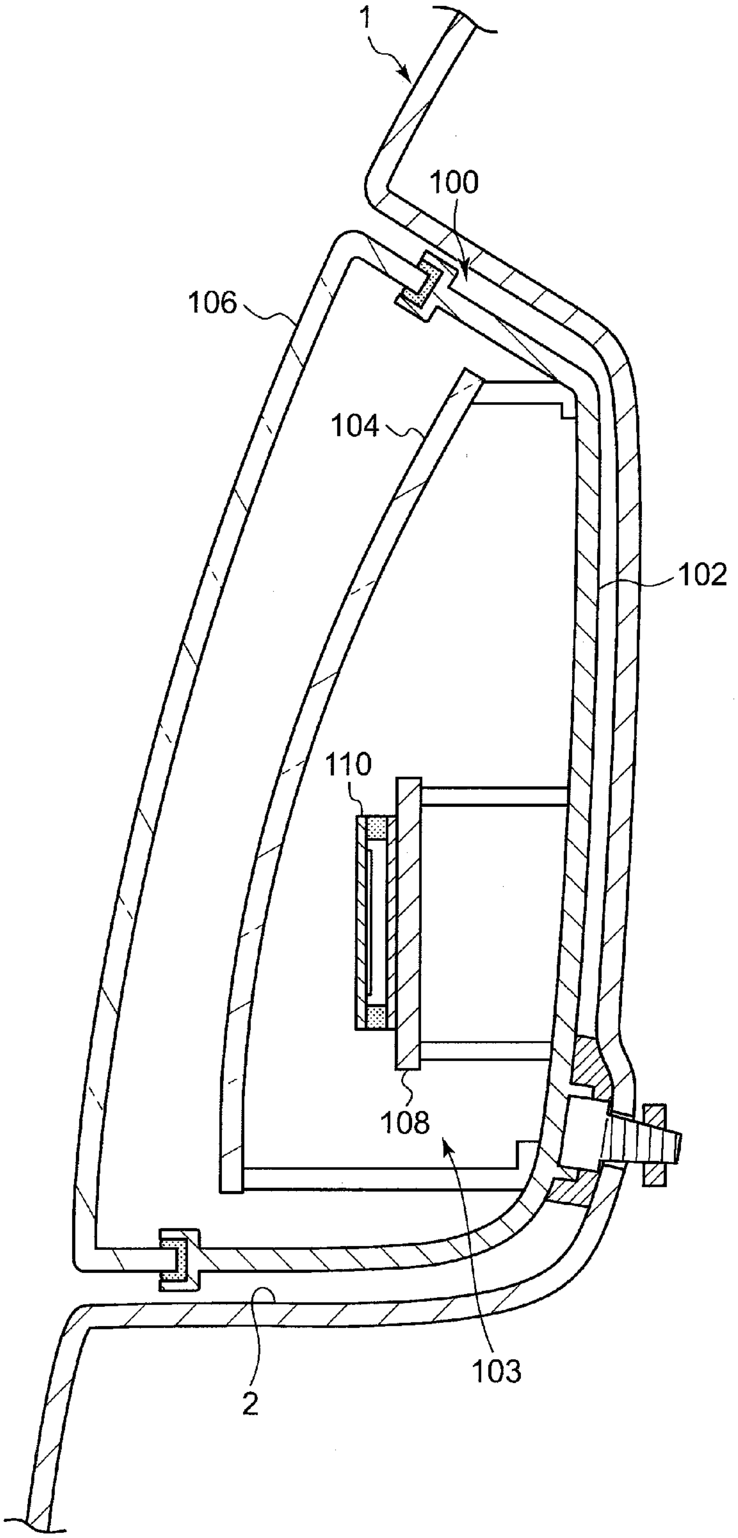
FIG. 1 is a vertical sectional view illustrating a schematic structure of a vehicular lamp according to an exemplary embodiment.

FIG. 1 is a vertical sectional view illustrating a schematic structure of a vehicular lamp according to an exemplary embodiment. A vehicular lamp 100 according to the exemplary embodiment is, for example, a tail lamp, arranged at the rear side of a vehicle. The vehicular lamp 100 is fixed to a rear panel 1 of a vehicle. Specifically, the rear panel 1 includes a recessed portion 2 recessed toward the vehicle front side, and the vehicular lamp 100 is accommodated in the recessed portion 2. The vehicular lamp 100 accommodated in the recessed portion 2 is fixed to the rear panel 1.

The vehicular lamp 100 includes a lamp body 102, and a translucent cover 104. The lamp body 102 is a casing having an opening at the vehicle rear side (the front side of the lamp). The translucent cover 104 is attached to the lamp body 102 while roughly covering the opening of the lamp body 102. The translucent cover 104 is made of a light-transmitting resin, glass, or the like, and serves as an inner cover (inner lens). At the lamp front side of the translucent cover 104, an outer cover (outer lens) 106 constituting an outer casing of the vehicular lamp 100 is provided. An opening of the recessed portion 2 is covered with the outer cover 106.

A lamp chamber 103 is formed by the lamp body 102 and the translucent cover 104. A light source 110 is accommodated in the lamp chamber 103. The light source 110 is mounted on a bracket 108. The bracket 108 is fixed to the lamp body 102.

Figure 2:
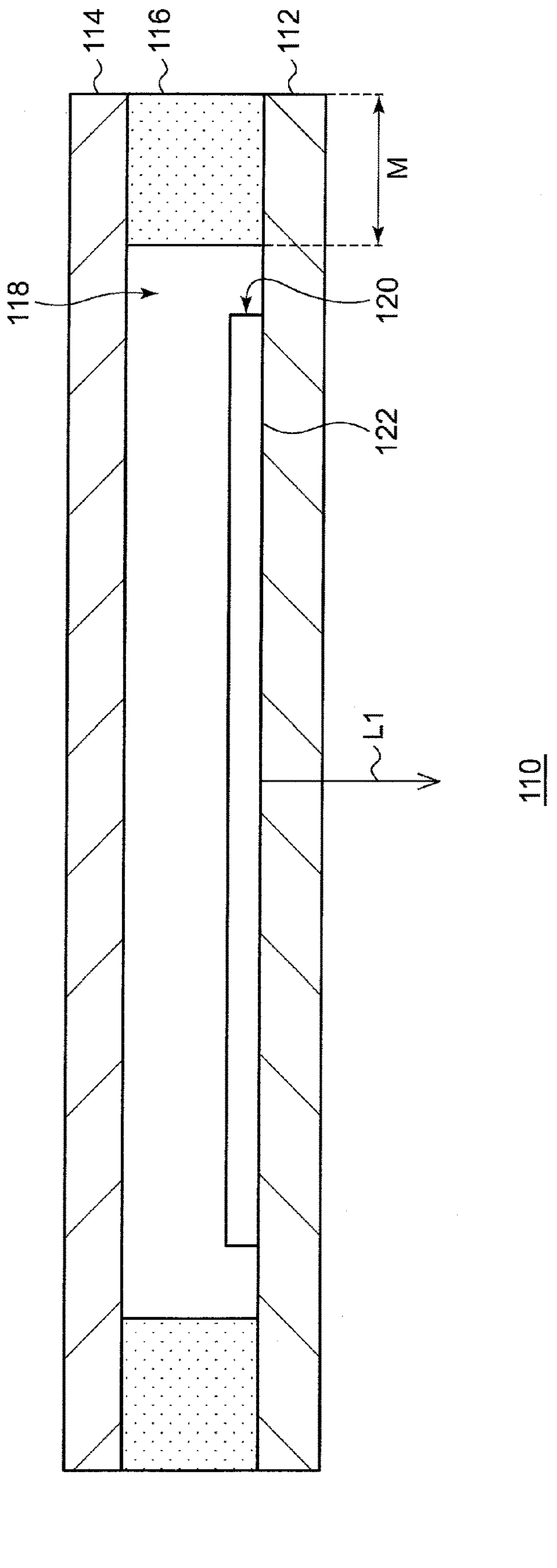
FIG. 2 is a sectional view illustrating a schematic structure of a light source.

FIG. 2 is a sectional view illustrating a schematic structure of the light source 110. The light source 110 includes a first substrate 112, a second substrate 114, and a sealant 116. The sealant 116 is interposed between the first substrate 112 and the second substrate 114 at the peripheral portions of the first substrate 112 and the second substrate 114. The first substrate 112, the second substrate 114, and the sealant 116 are made of conventionally known materials. For example, the first substrate 112 and the second substrate 114 are glass substrates or light-transmitting resin substrates. The sealant 116 is, for example, an adhesive that fixes the first substrate 112 to the second substrate 114.

An inner space 118 is formed by the first substrate 112, the second substrate 114, and the sealant 116. In the inner space 118, an organic EL element 120 is accommodated. The organic EL element 120 is a conventionally known general organic EL element, and has a light emitting surface 122. A light L1 emitted from the light emitting surface 122 irradiates the front side of the lamp through the first substrate 112.

In the organic EL element 120, uniform surface emission may be made. The organic EL element 120 has a relatively high flexibility, and may take, for example, a curved shape. The whole of the organic EL element 120 is substantially transparent. Thus, when the organic EL element 120 is used for the light source 110, the design of the vehicular lamp 100 may be enhanced. Since the organic EL element 120 is thin and lightweight, the depth dimension of the vehicular lamp 100 may be decreased. Also, the vehicular lamp 100 may become lightweight. The organic EL element 120 has a lower light directivity than a LED or the like. Thus, the visibility of the vehicular lamp 100 may be improved. It is possible to realize the vehicular lamp 100 that hardly gives glare to drivers and the like of other vehicles.

Meanwhile, as a result of intensive repetitive studies on the vehicular lamp 100 including the organic EL element 120, the inventors of the present disclosure have found that an appearance defect may occur in the vehicular lamp 100 due to the organic EL element 120.

Figure 3A:
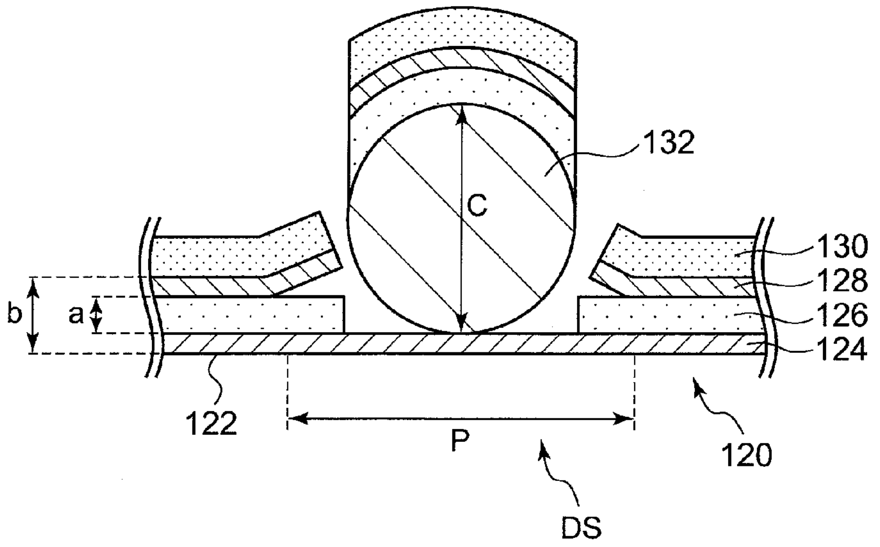
FIGS. 3A and 3B are schematic views illustrating a growth of a non-light emitting point in an organic EL element.
Figure 3B:
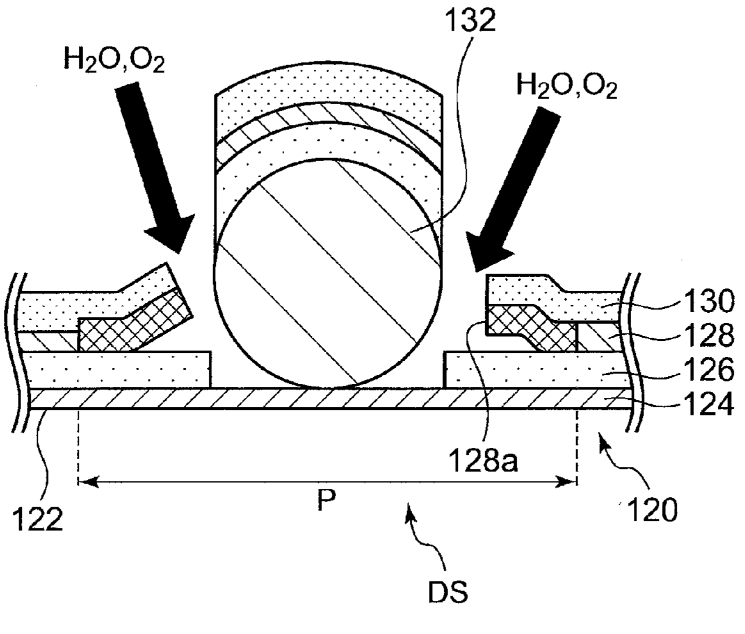

That is, the organic EL element 120 may include a non-light emitting point, also called a dark spot, on a light emitting surface. The non-light emitting point gradually grows with the lapse of usage time of the organic EL element 120. As a result, an appearance defect is caused in the vehicular lamp 100. FIGS. 3A and 3B are schematic views illustrating growth of a non-light emitting point in the organic EL element 120. FIG. 3A illustrates a region including a non-light emitting point in the organic EL element 120 at the initial usage stage in an enlarged view. FIG. 3B illustrates a region including a non-light emitting point in the organic EL element 120 at the last usage stage in an enlarged view.

As illustrated in FIG. 3A, the organic EL element 120 includes a first electrode 124, an organic layer 126, a second electrode 128 and an inorganic sealing layer 130. For example, the first electrode 124 is a positive electrode, and the second electrode 128 is a negative electrode. The first electrode 124 is a transparent electrode made of, for example, ITO, and the second electrode 128 is a metallic electrode. The organic layer 126 is a light emitting layer. The inorganic sealing layer 130 is made of, for example, silicon nitride ($SiN_x$), silicon oxide ($SiO_x$), or aluminum oxide ($AlO_x$), and serves as a barrier layer against, for example, moisture or oxygen. The inorganic sealing layer 130 prevents moisture or oxygen entering the inner space 118 from an outer space from coming in contact with, for example, the second electrode 128. The thickness a of the organic layer 126 is, for example, about 500 nm, and the total thickness b of the first electrode 124, the organic layer 126 and the second electrode 128 is, for example, about 1 μm.

During manufacturing of the organic EL element 120, when the organic layer 126 is stacked on the first electrode 124, foreign matter 132 such as dust present in a chamber may adhere to the first electrode 124. In a region of the first electrode 124 to which the foreign matter 132 adheres, the organic layer 126, the second electrode 128 and the inorganic sealing layer 130 are stacked on the foreign matter 132. The foreign matter 132 has a size equal to or larger than a distance between the first electrode 124 and the second electrode 128, or a thickness of the organic layer 126. For example, the size is about 10 μm. The size c of the foreign matter 132 is defined as the longest straight line among lines connecting two points at the outer edges of the foreign matter 132.

Accordingly, the organic layer 126, the second electrode 128, and the inorganic sealing layer 130 are divided into a portion normally stacked on the first electrode 124 and a portion stacked on the foreign matter 132. The first electrode 124 and the organic layer 126, or the organic layer 126 and the second electrode 128 may be separated (peeled) from each other at the end portion divided by the foreign matter 132. The separate portion and the foreign matter 132 constitute a non-light emitting point DS.

When the inorganic sealing layer 130 is divided by the foreign matter 132, moisture or oxygen present in the inner space 118 comes in contact with the second electrode 128. Accordingly, the end portion of the second electrode 128 is oxidized to form an oxide film 128*a*, and is peeled from the organic layer 126. The portion of the oxide film 128*a* does not emit light, and thus is included in the non-light emitting point DS. As the usage time of the vehicular lamp 100 elapses, the oxide film 128*a* gradually spreads. Thus, the non-light emitting point DS gradually grows with the lapse of the usage time of the organic EL element 120.

Until now, it has been assumed that the organic EL element 120 is used as a general lighting lamp. In the case of the general lighting lamp, the organic EL element 120 is hardly directly viewed. Even when the organic EL element 120 is directly viewed, the organic EL element 120 is located relatively far from an observer. A life required for a general lighting lamp is much shorter than the vehicular lamp 100. Thus, in the general lighting lamp, the size of the non-light emitting point DS which is allowable for use is larger than that of the vehicular lamp 100, and the growth of the non-light emitting point DS is not problematic.

Meanwhile, in the case of the vehicular lamp 100, the organic EL element 120 is frequently directly viewed. Also, the organic EL element 120 is frequently directly viewed by an observer at a location closer to the observer than the general lighting lamp. It is assumed that the use period of the vehicular lamp 100, that is, the end-of-life, is much longer than the general lighting lamp, that is, 10 years and further, 15 years. Furthermore, the vehicular lamp 100 is frequently placed in an environment of high temperature and high humidity as compared to the general lighting lamp. For this reason, even when the non-light emitting point DS has a size substantially allowable for use at the initial usage stage of the vehicular lamp 100, the non-light emitting point DS may grow to a size substantially non-allowable for use, that is, a size that may cause an appearance defect at the last usage stage. The initial usage stage of the vehicular lamp 100 is defined as a point of time of, for example, new vehicle registration. The last usage stage of the vehicular lamp 100 is defined as a point of time when, for example, 15 years have passed from the initial usage stage.

The moisture or oxygen which causes the growth of the non-light emitting point DS mainly enters the inner space 118 through the sealant 116 from the outer space. Thus, the thickness M of the sealant 116 (see, e.g., FIG. 2) from the inner space 118 to the outer space affects the growth of the non-light emitting point DS. That is, the growth rate of the non-light emitting point DS is changed by the thickness M. The thickness M of the sealant 116 in the light source 110 assumed to be used for the vehicular lamp 100 is 22.5 mm or less. The permeability of moisture or oxygen in the first substrate 112 and the second substrate 114 is significantly lower than that in the sealant 116. Thus, the entry of the moisture or oxygen through the first substrate 112 or the second substrate 114 is ignorable.

The inventors of the present disclosure have performed an acceleration test in order to clarify the relationship between the thickness M of the sealant 116, and the growth rate and size P of the non-light emitting point DS. In the corresponding acceleration test, a plurality of organic EL elements 120 which are different in the thickness M of the sealant 116 were placed in the most severe environment (temperature 70° C. to 90° C., humidity 85% to 95%) among vehicle usage environments, and a rated current was applied and light emission was made for 1,000 hours. This condition corresponds to a case where the last usage stage of the vehicular lamp 100 is set to arrive 15 years later. The last usage stage of the vehicular lamp 100 generally coincides with the last usage stage of the vehicle.

Before and after the acceleration test, the light emitting surface 122 of each of the organic EL elements 120 was photographed with a camera (resolution: 13.4 μm/pix), and through analysis on the obtained images, the numbers and the sizes P of non-light emitting points DS were compared. The size P of the non-light emitting point DS is defined as a longest straight line among lines connecting two points at the outer edges of the non-light emitting point DS. From the obtained results, the growth rate of the non-light emitting point DS at the last usage stage was calculated. The maximum value of the size P of the non-light emitting point DS allowable at the last usage stage may be preferably 300 μm or less, more preferably 100 μm or less, and further more preferably 50 μm or less. In general, 50 μm is the lower limit of the size that may be visually recognized with naked eyes.

Accordingly, while the size P of the non-light emitting point DS allowable at the last usage stage was set to 50 μm, 100 μm, and 300 μm at the maximum, the obtained growth rate was used to calculate the maximum value of the size P of the non-light emitting point DS allowable at the initial usage stage in each case. FIG. 4 is a table indicating a relationship between the thickness M of the sealant 116, and the growth rate and size P of the non-light emitting point DS.

As noted in FIG. 4, when the thickness M of the sealant 116 ranges from 1 mm to 3 mm, the growth rate of the last usage stage is 32 times. The growth rate is the largest value in the light source 110 assumed to be used for the vehicular lamp 100. When the thickness M of the sealant 116 ranges from 17.5 mm to 22.5 mm, the growth rate of the last usage stage is 2.5 times. The growth rate is the smallest value in the light source 110 assumed to be used for the vehicular lamp 100.

In the organic EL element 120 having the minimum growth rate of the non-light emitting point DS, when the maximum size P of the non-light emitting point allowable at the last usage stage is 300 μm, that is, when a non-light emitting point of 300 μm or less is allowable as causing no appearance defect, the presence of the non-light emitting point DS is allowable as long as the size P is 120 μm or less at the initial usage stage. Accordingly, the vehicular lamp 100 according to the exemplary embodiment includes the organic EL element 120 that includes only the non-light emitting point DS with a size P of 120 μm or less on the light emitting surface 122.

Accordingly, the appearance defect of the vehicular lamp 100 may be suppressed. When the size P of the non-light emitting point DS is 120 μm at least at the initial usage stage of the vehicular lamp 100, the size P will never exceed 300 μm, which is allowable at the last usage stage of the vehicular lamp 100. Accordingly, at any time during the use period, when the size P of the non-light emitting point DS present on the light emitting surface 122 is 120 μm or less, it is possible to satisfy the condition that the size is 300 μm or less at the last usage stage. Thus, the appearance defect of the vehicular lamp 100 may be suppressed.

In the organic EL element 120 having the minimum growth rate of the non-light emitting point DS, when the size P allowable at the last usage stage is 100 μm, the non-light emitting point DS of 40 μm or less is allowed. When the size P allowable at the last usage stage is 50 μm, the non-light emitting point DS of 20 μm or less is allowed. Thus, the vehicular lamp 100 includes the organic EL element 120 that includes only the non-light emitting point DS with a size P of preferably 40 μm or less, more preferably 20 μm or less on the light emitting surface 122.

In the organic EL element 120 having the maximum growth rate of the non-light emitting point DS, when the maximum size P of the non-light emitting point allowable at the last usage stage is 300 μm, the non-light emitting point DS of 9 μm or less is allowed. When the size P allowable at the last usage stage is 100 μm, the non-light emitting point DS of 3 μm or less is allowed. When the size P allowable at the last usage stage is 50 μm, the non-light emitting point DS of 1 μm or less is allowed. Thus, the vehicular lamp 100 according to the exemplary embodiment includes the organic EL element 120 that includes only the non-light emitting point DS with a size P of preferably 9 μm or less, more preferably 3 μm or less, still more preferably 1 μm or less on the light emitting surface 122. The allowable size P of the non-light emitting point DS may be properly set based on FIG. 4 when the thickness M of the sealant 116 and the size P of the non-light emitting point DS obtained at the last usage stage are determined.

Based on the relationship between the thickness M of the sealant 116 and the growth rate and size P of the non-light emitting point DS, which has been found by the inventors of the present disclosure, an inspection method of the organic EL element 120 is provided. The inspection method of the organic EL element 120 according to the exemplary embodiment includes sorting an organic EL element 120 having a non-light emitting point DS with a size P larger than a predetermined threshold value P on the light emitting surface 122 as a defective product. The threshold value used in the sorting is 120 μm or less. Accordingly, the appearance defect of the vehicular lamp 100 may be suppressed. The presence of the non-light emitting point DS may be detected by using, for example, a general laser microscope. The lower limit of the size P of the non-light emitting point DS is, for example, 0.1 μm which corresponds to the detection limit of a general laser microscope. The threshold value used for the sorting may be properly set based on FIG. 4, when the thickness M of the sealant 116 and the size P of the non-light emitting point DS obtained at the last usage stage are determined.

As described above, the vehicular lamp 100 according to the exemplary embodiment includes the organic EL element 120 that includes only the non-light emitting point DS with a size of 120 μm or less on the light emitting surface 122. Accordingly, the appearance defect of the vehicular lamp 100 may be suppressed. The size of the non-light emitting point DS included in the light emitting surface 122 is preferably 20 μm or less. Accordingly, the appearance defect of the vehicular lamp 100 may be further suppressed.

The inspection method of the organic EL element 120 according to the exemplary embodiment includes sorting an organic EL element 120 having a non-light emitting point DS with a size P larger than a predetermined threshold value P on the light emitting surface 122 as a defective product. The above described threshold value is 120 μm or less. Accordingly, the appearance defect of the vehicular lamp 100 may be suppressed.

(Modification)

Figure 5:
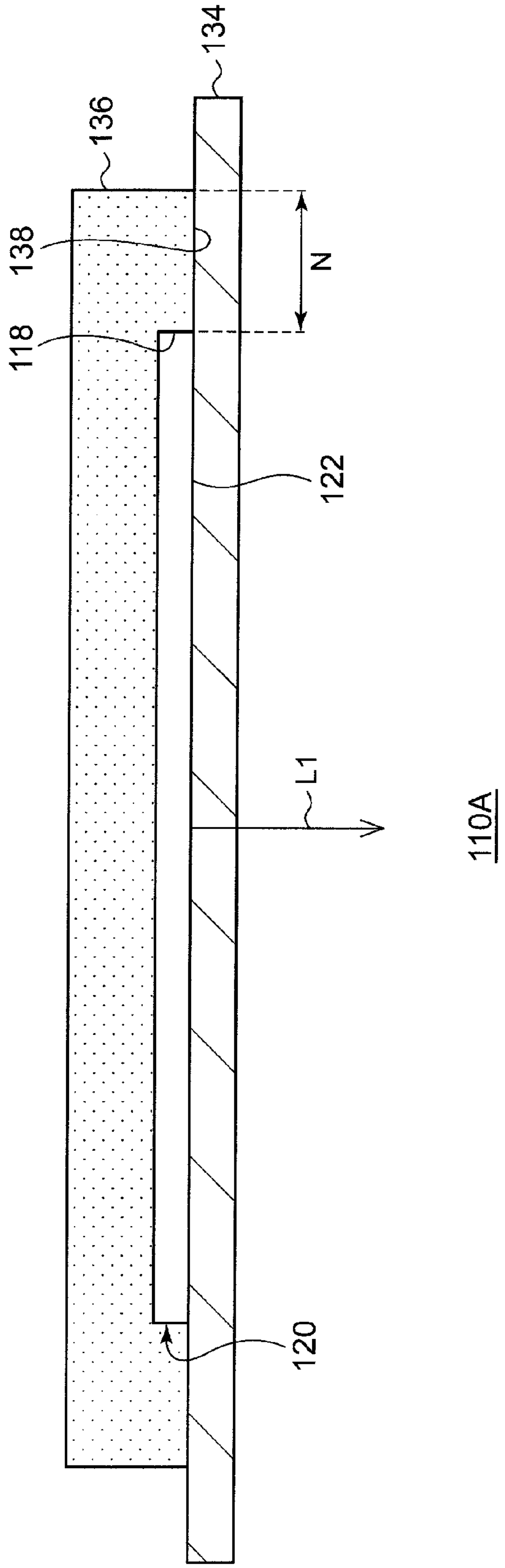
FIG. 5 is a sectional view illustrating a schematic structure of a light source according to a modification.

As the light source 110, a light source having the structure illustrated in FIG. 5 may be used. FIG. 5 is a sectional view illustrating a schematic structure of a light source according to a modification. A light source 110A according to the modification includes a substrate 134 and a sealant 136. The sealant 136 covers the surface of the substrate 134, more specifically, a mounting area of an organic EL element 120 on the main surface at one side of the substrate 134. The substrate 134 and the sealant 136 are made of conventionally known materials.

The substrate 134 and the sealant 136 form an inner space 118. In the inner space 118, the organic EL element 120 is accommodated. A light L1 emitted from a light emitting surface 122 of the organic EL element 120 irradiates the front side of the lamp through the substrate 134. In the light source 110A according to the modification, the main surface at one side of the organic EL element 120 abuts on the substrate 134. The main surface at the other side of the organic EL element 120, and side surfaces of the organic EL element 120 abut on the sealant 136.

In the light source 110A, the moisture or oxygen which causes the growth of the non-light emitting point DS mainly enters the inner space 118 through an interface 138 between the substrate 134 and the sealant 136 from the outer space. Thus, the length N of the interface 138 from the inner space 118 to the outer space affects the growth of the non-light emitting point DS. The length N of the interface 138 in the light source 110A assumed to be used for the vehicular lamp 100 is 22.5 mm or less. The permeability of moisture or oxygen in the substrate 134 and the sealant 136 is significantly lower than that in the interface 138. Thus, the entry of the moisture or oxygen through the substrate 134 and the sealant 136 is ignorable.

The relationship between the thickness M of the sealant 116 and the growth rate and size P of the non-light emitting point DS, which has been described in the exemplary embodiment, may be similarly applied to the light source 110A according to the modification merely by replacing the thickness M of the sealant 116 with the length N of the interface 138. Accordingly, in the light source 110A according to the modification as well, the same effect may be achieved when the configuration of the vehicular lamp 100 and the inspection method of the organic EL element 120 according to the exemplary embodiment are employed.

(Others)

The vehicular lamp 100 may be a marker lamp such as a turn signal lamp, a daytime running lamp, and a clearance lamp, a head lamp, a brake lamp or the like.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A vehicular lamp comprising an organic EL element that has a non-light emitting defect point with a size of 120 μm or less on a light emitting surface, wherein the organic EL element is accommodated in an inner space formed by a first substrate, a second substrate, and a sealant interposed between the first substrate and the second substrate at peripheral portions of the first substrate and the second substrate, and a thickness of the sealant from the inner space to an outer space is about 22.5 mm or less so as to as to suppress an appearance of the non-light emitting defect point at a predetermined time.

2. The vehicular lamp of claim 1, wherein a size of the non-light emitting defect point is 20 μm or less.

3. The vehicular lamp of claim 1, wherein the predetermined time is approximately 10 to 15 years.

4. A vehicular lamp comprising an organic EL element that has a non-light emitting defect point with a size of 120 μm or less on a light emitting surface, wherein the organic EL element is accommodated in an inner space formed by a substrate and a sealant that covers a surface of the substrate, and a length of an interface between the substrate and the sealant from the inner space to an outer space is about 22.5 mm or less so as to as to suppress an appearance of the non-light emitting defect point at a predetermined time.

5. The vehicular lamp of claim 4, wherein a size of the non-light emitting defect point is 20 μm or less.

6. The vehicular lamp of claim 4, wherein the predetermined time is approximately 10 to 15 years.

* * * * *